May 25, 1965    W. F. PESCHEL ETAL    3,185,810
BAR END HEATING APPARATUS
Filed July 27, 1960
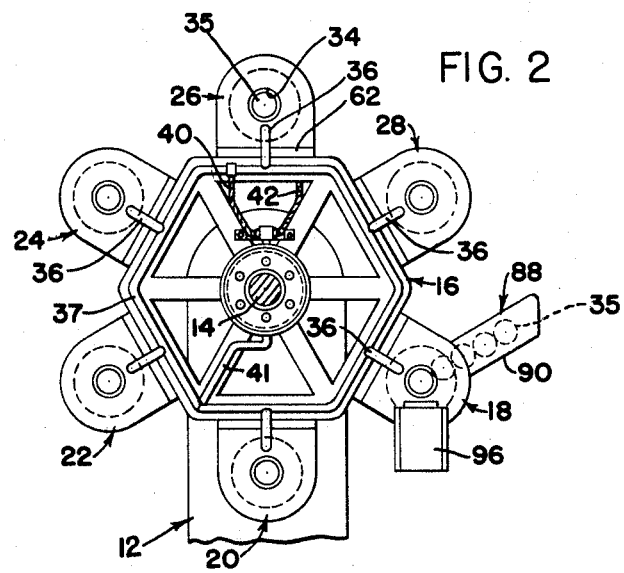
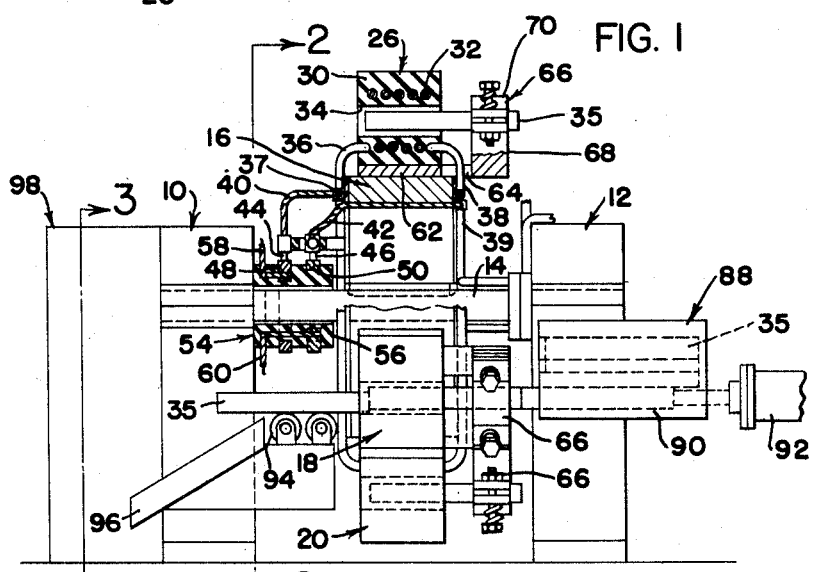
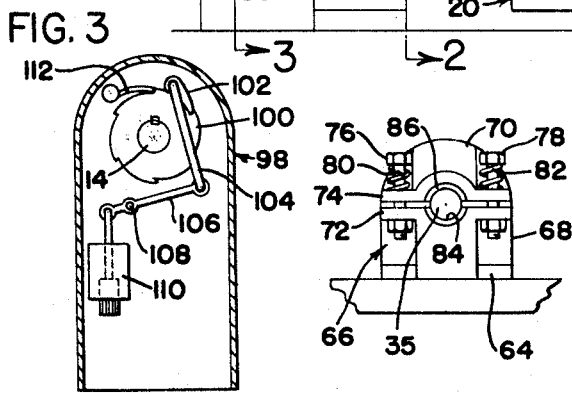
INVENTORS.
WILLIAM F. PESCHEL &
CHESTER A. TUDBURY
BY *Alfred C. Body*
ATTORNEY ic heating apparatus for
efficiently heating the ends of steel bars and the like.

3,185,810
BAR END HEATING APPARATUS
William F. Peschel, Birmingham, Mich., and Chester A. Tudbury, White Plains, N.Y., assignors to The Ohio Crankshaft Company, Cleveland, Ohio, a corporation of Ohio
Filed July 27, 1960, Ser. No. 45,624
5 Claims. (Cl. 219—10.69)

This invention pertains to the art of induction heating, and more particularly to induction heating apparatus for efficiently heating the ends of steel bars and the like.

It is often desired, in manufacturing operations, to heat only the end of a steel bar to the forging temperature. It is also desirable to have a continuous supply of such bars, each available at a predetermined time interval after the preceding bar.

Heretofore it has been customary to provide a plurality of helical induction heating coils disposed adjacent to the forging machine and the workman inserted the end of the bar into the coil and then left it for a sufficient period of time for the end of the bar to reach the required temperature. In the meantime, the workman extracted another bar from another coil which was heating and performed the necessary forging operations on it.

When it was desired to automate such bar and heating operations, a channel coil was employed so that the bars could be mounted on a conveyor means and the end continuously and progressively moved through the channel of such coils. Channel coils are electrically inefficient and also the bars must be continuously rotated within the channel of the coil in order that the ends be uniformly heated. This problem of uniform heating and rotation of the bar while it is heating does not hold with the helical coil.

The present invention contemplates new and improved induction heating apparatus for the ends of bars and the like which overcomes the above referred to difficulties and others and provides apparatus which will continuously supply at timed interval bars with their ends heated to the proper forging temperature.

In accordance with the present invention, a bar end heating apparatus is provided comprised of a plurality of helical induction heating coils arranged in equally spaced relationship about a central axis, such coils being indexed from point to point around such axis in combination with means for automatically loading a bar end into the coil when it is in one position and removing such bar when the coil has been indexed through a plurality of positions and reaches a further predetermined position.

The principal object of the invention is a provision of new and improved apparatus for inductively heating the ends of bars and other similar workpieces which is relatively simple in construction, which will provide a continuous and automatic supply of bars heated to the proper forging temperature and which is electrically efficient.

Another object of the invention is the provision of a new and improved bar end heating apparatus incorporating means for automatically handling the workpieces being heated from an entry point to a discharge point.

Another object of the invention is the provision of a new and improved arrangement for heating the ends of bars, including a plurality of coils indexed from a load point to a discharge point, in combination with means for automatically feeding bar ends into the coils at the load point and for removing the bars at the discharge point.

The invention may take physical form in certain parts and arrangements of parts the preferred embodiment of which will be described in detail in this specification and illustrated in the accompanying drawing, which is a part hereof and wherein:

FIGURE 1 is a partially broken away side view of the induction heating apparatus of the present invention;

FIGURE 2 is a cross-sectional view of the apparatus of FIGURE 1 taken along line 2—2 of FIGURE 1;

FIGURE 3 is a cross-sectional view taken along line 3—3 of FIGURE 1 illustrating the indexing device for the rotary frame member of the invention; and FIGURE 4 is an end view of the clamping devices shown in FIGURE 1 which are employed to hold workpieces whereby their ends will extend into an associated induction heating coil.

Referring now to the drawings, wherein the showings are for the purposes of illustrating a preferred embodiment of the invention only and not for the purposes of limiting same, FIGURES 1 and 2 show apparatus constructed in accordance with the present invention and including a pair of spaced stands 10 and 12 which support a shaft 14 for rotation about a horizontal axis. Keyed to the shaft 14, or otherwise securely fastened thereto, is a generally hexagonal frame member 16 which supports on its periphery six induction heating coils 18, 20, 22, 24, 26 and 28.

As best shown in FIGURE 1, each of the induction heating coils 18–28 comprises a block of insulating material 30 having a helical induction coil 32 imbedded therein. Extending through the blocks 30, and coaxial with the axis of the induction coil 32, is an opening 34 adapted to receive the end of a workpiece 35 to be heated. As shown, the induction coil 32 is formed of a hollow tubular member having extensions 36 and 38 adapted for connection to generally ring-like tubes 37 and 39, respectively, which are carried on either side of the frame 16. As shown in FIGURE 2, each ring-like tube 37 or 39 is connected through conduit 41 to the interior of shaft 14 where it communicates with a rotary fluid coupling, not shown. With this arrangement, a cooling fluid may be conducted from ring-like tube 37 through the induction coils to tube 39 whereby the heat generated during an induction heating operation will be carried away by the fluid flowing through the hollow induction coils.

Although the heating coils are shown herein as being imbedded in a block of insulating material, it will be apparent that other and different types of induction heating coil constructions may be employed. Thus, the individual turns of the coil may be wrapped in insulating material rather than imbedded in an insulating block as shown herein. Likewise, a solid helical member may be employed as an induction coil in conjunction with an abutting coiling tube which surrounds the coil.

The opposite ends of the coils 32 are connected through tubes 37 and 39, which are insulated from frame member 16, and electrical leads 40 and 42 to brushes 44 and 46 which contact slip rings 48 and 50 on a commutator, generally indicated at 54. As shown, the commutator 54 comprises a block 56 of insulating material carried on the stand 10, which block carries the slip rings 48 and 50. Electrical leads 58 and 60 serve to convey current to the slip rings 48 and 50, respectively. With this arrangement, the commutator 54, being secured to the stand 10, will remain stationary while the frame 16 and brushes 44 and 46 rotate around the slip rings in a manner well known in the art.

As best shown in FIGURE 1, each of the insulating blocks 30 is carried on a plate 62 which is secured to the frame 16 and has an extension 64 which carries a workpiece clamping device, generally indicated at 66. As is best shown in FIGURE 4, each of the clamps 66 comprises a lower generally semi-circular member 68 which is secured to the extension 64 and an upper semi-circular member 70. The members 68 and 70 are provided with flanges 72 and 74 respectively through which bolts 76 and 78 extend. Springs 80 and 82 are interposed between the heads of bolts 76 and 78 and the flange 74 whereby the member 70 will be resiliently biased toward the member 68. The facing surfaces of the members 68 and 70 are provided with generally semi-circular grooves to provide a circular opening 84 into which a workpiece may be inserted. The forward end of the opening 84, that is, the right end as viewed in FIGURE 1, is chamfered as at 86 whereby a workpiece may be readily inserted into the clamp from the right as shown in FIGURE 1 and pushed therethrough until its one end extends into an associated one of the induction heating coils 18–28.

Carried on the stand 12 is a workpiece loading device, generally indicated at 88, which comprises a workpiece-holding chute 90 adapted to deliver successive workpieces into alignment with a hydraulic pushing cylinder 92. The cylinder 92, in turn, is positioned whereby it may push a workpiece through a clamp 66 and into the interior of its associated heating coil, forcing the heated workpiece out of the other end of the coil and on to rollers 94 which deliver it to an exit chute 96.

In the operation of the device, each of the induction heating coils and their associated clamps will be brought into alignment with the cylinder 92 in succession whereby an unheated workpiece may be inserted into the coil while the heated workpiece is ejected therefrom. In order to move each successive induction coil 18–28 into alignment with the cylinder 92 for a loading operation, an indexing mechanism 98 (FIGURE 3) is provided. The indexing mechanism is located on the left side of stand 10 as viewed in FIGURE 1 and comprises a ratchet 100 which is keyed or otherwise securely fastened to the shaft 14 together with a pawl 102 which is adapted to engage the notches on the periphery of the ratchet. As shown, the pawl is connected through linkage 104 to one end of a lever 106 which is pivotable about point 108. The opposite end of the lever 106 is connected to a solenoid, generally indicated at 110. A leaf spring 112 engages successive notches in the periphery of the ratchet 100 as they pass thereby. With this arrangement, one of the induction coils 18–28 will always be aligned with the cylinder 92 to permit a workpiece to be inserted into that coil. After the workpiece is thus loaded, solenoid 110 will be actuated to rotate ratchet 100 and frame member 16 in a clockwise direction as shown in FIGURE 2 until the coil 28 is aligned with the cylinder 92. The cylinder is then pressurized to insert a billet into the coil 28 while ejecting a heated billet therefrom. After this operation, the solenoid 110 is again actuated whereby coil 26 will be moved into alignment with cylinder 92; and after it is loaded, the coil 24 will be moved into alignment with cylinder 92, and so on.

It can thus be seen that as frame member 16 is rotated by indexing device 98, each of the induction coils 18–28 will be moved into alignment with cylinder 92 in succession whereby a new billet may be loaded into the coil and held therein by clamp 66 while a heated billet is ejected from that coil. The end of the workpiece is then heated as the coil rotates around shaft 14, and by the time it again reaches a point where it is in alignment with cylinder 92 it will be fully heated and ready to be ejected by the insertion of a new workpiece. During this time, of course, power is supplied to the coils 18–28 through the slip rings 48 and 50 and the brushes 44 and 46.

Although the invention has been shown in connection with a certain specific embodiment, it will be apparent to those skilled in the art that various changes in form and arrangement of parts may be made to suit requirements without departing from the spirit and scope of the invention.

Having thus described our invention, we claim:

1. Induction heating apparatus comprising a generally circular frame member rotatable about a stationary, horizontal axis, a plurality of induction coils circumferentially spaced around the periphery of said frame member and secured thereto, a plurality of spring-loaded clamping devices carried by said frame member and rotatable therewith, each of said clamping devices being positioned at one end of an associated one of the induction coils and adapted to clamp a workpiece with its end extending into the induction coil, said spring-loaded clamping device comprising a base mounted on said frame, a cap reciprocally mounted with respect to said base and spring means to force said cap toward said base, said workpiece releasably supported between said cap and said base, means located at a fixed angular position about said axis for loading workpieces into the induction coils, and apparatus for rotating the frame member step-by-step whereby each induction coil will be stopped in succession adjacent the loading means to permit a workpiece to be loaded therein.

2. Induction heating apparatus comprising a generally circular frame member rotatable about a stationary axis, a plurality of induction coils circumferentially spaced around the periphery of said frame member and secured thereto, a plurality of clamping devices carried by said frame member and rotatable therewith, each of said clamping devices being positioned at one end of an associated one of the induction coils and comprising a pair of separable semi-circular elements which together define a generally ring-like configuration having an axis generally aligned with the axis of an associated one of the induction coils, one of said elements being rigidly fixed to the frame member and the other element being spring biased toward the said one element whereby a workpiece may be held between the elements with its end extending into the associated one of said induction coils, means located at a fixed angular position about said stationary axis for forcing workpieces through the opening formed between said semi-circular elements and into an induction coil assembly whereby one end of the workpiece will be positioned within the coil assembly while the other end will be held between the semi-circular elements, and apparatus for rotating the frame member step-by-step whereby each induction coil and its associated clamping device will be stopped in succession adjacent the loading means to permit a workpiece to be pushed through the semi-circular elements and into the induction coil.

3. Induction heating apparatus comprising a generally circular frame member rotatable about a stationary, horizontal axis, a plurality of open-ended induction coils circumferentially spaced around the periphery of said frame member and secured thereto, the axes of said induction coils being parallel to said stationary axis and being spaced from the stationary axis by a common radial distance, a plurality of clamping devices carried by said frame member and rotatable therewith, each of said clamping devices comprising a pair of separable generally semi-circular elements which together define an annular assembly which is coaxial with an associated one of the induction coils, one of said elements being rigidly fixed to said frame member and the other element being spring biased toward said one element whereby one end of the workpiece may be removably secured between the elements with the other end of the workpiece extending into the associated induction coil, means including a reciprocating member located at a fixed angular position about said stationary axis for loading workpieces into the induction coils, the path of reciprocation of said reciprocating member being parallel to said stationary axis and spaced therefrom in an amount equal to said common radial distance, and apparatus for rotating the frame member step-by-step whereby each induction coil and its associated clamping device will be stopped in succession adjacent the reciprocating member, the arrangement being such that the reciprocating member may force a workpiece to be heated axially forwardly through the separable elements of the clamping device and into the associated induction coil while ejecting a heated workpiece from the other side of the induction coil.

4. An induction heating apparatus comprising a conveyor having a plurality of generally parallel induction coils mounted thereon, a single device located adjacent the path of the conveyor for pushing workpieces axially forwardly into the interior of a coil, said device including a member reciprocable along a path extending substantially parallel to the axis of said coils, a plurality of clamping devices each of which is secured to said conveyor at the end of an associated one of said induction coils which faces said reciprocable member, each of said clamping devices being adapted to hold one end of a workpiece with the other end positioned within the induction coil associated with the clamping device, and means for advancing the conveyor step-by-step whereby said induction coil is stopped in succession in general alignment with said reciprocable member whereby a workpiece to be heated may be pushed into the induction coil by the reciprocable member and clamped by its associated clamping device, said each clamping device comprises a pair of separable, generally semi-circular elements which together form a generally circular configuration which is coaxial with an induction coil on the conveyor, one of said semicircular elements being fixedly connected to the conveyor, and the other of said semi-circular elements being resiliently biased toward said one element whereby a workpiece to be heated may be forced axially forwardly through the semi-circular elements into the interior of an induction coil causing said other semi-circular elements to move away from said one element in an amount sufficient to permit the workpiece to pass between the elements.

5. An induction heating apparatus comprising a generally circular frame rotatable about a stationary axis, a plurality of mounting surfaces on said frame, a plurality of heating stations each comprising a base, an individual cylindrical induction coil with a central passage therethrough mounted on said base and a spring biased clamping device having a first element mounted on said base and a second element reciprocally mounted with respect to said first element and spring biased toward said first element to hold a workpiece between said element, said base of each heating station attached on one of said mounting surfaces of said frame to secure said heating station on said frame, means located at a fixed angular position about said axis for loading workpieces into the induction coil, and apparatus for rotating the frame member step-by-step whereby each heating station will be brought in succession adjacent the loading means to permit the loading means to insert a workpiece into one end of said central passage, and ejecting means for ejecting a heated workpiece from said heating station.

References Cited by the Examiner

UNITED STATES PATENTS

| | | | |
|---|---|---|---|
| 1,365,198 | 1/21 | Sessions | 219—7.5 |
| 2,324,184 | 7/43 | Wyman | 24—263.5 |
| 2,378,707 | 6/45 | Hiller | 219—140 |
| 2,414,362 | 1/47 | Denneen et al. | 219—10.69 |
| 2,647,199 | 7/53 | Wharff | 219—10.69 |
| 2,791,674 | 5/57 | Westin et al. | 219—7.5 |
| 2,942,089 | 6/60 | Baker et al. | 219—10.69 |
| 3,051,812 | 8/62 | Gschwender | 219—10.69 |
| 3,056,876 | 10/62 | Schmidt | 219—10.69 |
| 3,065,536 | 11/62 | Chapman | 219—101 |

FOREIGN PATENTS 1,214,255   4/60   France.

RICHARD M. WOOD, *Primary Examiner.*

MAX L. LEVY, *Examiner.*